United States Patent
Wang

(10) Patent No.: US 7,376,397 B2
(45) Date of Patent: May 20, 2008

(54) KEY SETTING METHODS

(75) Inventor: Hung-Chin Wang, Taipei (TW)

(73) Assignee: Benq Corporation, Taoyuan (TW)

( * ) Notice: Subject to any disclaimer, the term of this patent is extended or adjusted under 35 U.S.C. 154(b) by 431 days.

(21) Appl. No.: 11/146,859

(22) Filed: Jun. 7, 2005

(65) Prior Publication Data

US 2005/0282577 A1     Dec. 22, 2005

(30) Foreign Application Priority Data

Jun. 8, 2004 (TW) ............................ 93116399 A

(51) Int. Cl.
*H04B 1/38* (2006.01)
(52) U.S. Cl. ............... 455/90.3; 455/550.1; 455/575.1; 455/563; 379/428.01; 379/434; 235/380; 361/680
(58) Field of Classification Search ............... 455/90.3, 455/550.1, 564, 575.1; 379/428.01, 434
See application file for complete search history.

(56) References Cited

U.S. PATENT DOCUMENTS

| | | | | |
|---|---|---|---|---|
| 5,337,346 | A * | 8/1994 | Uchikura ................. | 455/556.2 |
| 5,452,358 | A * | 9/1995 | Normile et al. ............... | 380/42 |
| 5,768,379 | A * | 6/1998 | Girault et al. ............... | 713/185 |
| 6,104,807 | A * | 8/2000 | Johnson et al. ........ | 379/428.04 |
| 6,292,657 | B1 * | 9/2001 | Laursen et al. .............. | 455/411 |
| 6,473,609 | B1 * | 10/2002 | Schwartz et al. ........... | 455/406 |
| 6,594,347 | B1 * | 7/2003 | Calder et al. ............ | 379/88.01 |
| 6,704,031 | B1 * | 3/2004 | Kimball et al. .............. | 715/745 |
| 6,715,131 | B2 * | 3/2004 | Martin et al. ............... | 715/202 |
| 7,003,284 | B2 * | 2/2006 | Schwartz et al. ......... | 455/414.1 |
| 7,020,270 | B1 * | 3/2006 | Ghassabian ................. | 379/368 |
| 7,133,706 | B2 * | 11/2006 | Kespohl et al. .......... | 455/575.1 |
| 7,155,544 | B2 * | 12/2006 | Im .............................. | 710/67 |
| 7,255,270 | B2 * | 8/2007 | Kwon et al. ................. | 235/382 |
| 7,274,681 | B2 * | 9/2007 | Oki ............................. | 370/345 |
| 7,280,851 | B2 * | 10/2007 | Oba et al. .................... | 455/566 |

FOREIGN PATENT DOCUMENTS

TW       535383       6/2003

* cited by examiner

*Primary Examiner*—Marceau Milord
(74) *Attorney, Agent, or Firm*—Thomas, Kayden, Horstemeyer & Risley

(57) ABSTRACT

A method of user-defined key setting in a portable electronic communication device. Corresponding relationships between keys and functions is recorded in a first mapping table and the portable electronic communication device executes the functions accordingly. When a user-defined key is to be set, a first key input and a function input are first received. The corresponding relationship between the first key input and the function input is then recorded in a second mapping table. The portable electronic communication device executes the functions according to the second mapping table.

11 Claims, 6 Drawing Sheets

KEY SETTING METHODS

BACKGROUND

The invention relates to methods of setting keys for electronic device, and in particular to user-defined key settings thereof.

Currently, function keys of electronic communication devices, such as a mobile phone or PDA (personal digital assistant), are set by the manufacturer through function key definition, such as a mapping table, coordinating with hardware for specific functions. For example, a mobile phone may provide a menu key, a dial key, and an off key on the keypad to display menus, dial, and turn off. The function keys generally cannot be changed, including the key arrangement or their corresponding functions.

FIG. 1 is a diagram of a keypad of an exemplary portable electronic communication device, where "b" is a menu key, "g" is a dial key, and "d" is an off key. When a key on the keypad is pushed, the hardware produces an interrupt to notify a function execution module. The function execution module then acquires the function corresponding to the key according to a mapping table stored in the portable electronic communication device. An application program corresponding to the acquired function is activated accordingly.

The mapping table is predefined by the manufacturer and coordinated with hardware. Thus, function keys generally cannot be modified or redefined by users. Whenever a user adopts a new portable electronic communication device, different key arrangements and operation must be assimilated, causing inconvenience.

SUMMARY

Methods of user-defined key setting in a portable electronic communication device are provided. In an exemplary embodiment, the portable electronic communication device provides keys and functions. Each key corresponds to one function. The relationship between the keys and the functions is recorded in a first mapping table. The portable electronic communication device executes the functions according to the first mapping table. When an user defined key is to be set, a first key input and a function input are received from user input. The relationship between the first key input and the function input is then recorded in a second mapping table, according to which the portable electronic communication device executes the functions.

DESCRIPTION OF THE DRAWINGS

The invention can be more fully understood by reading the subsequent detailed description and examples with references made to the accompanying drawings, wherein.

DESCRIPTION

Figure 2:
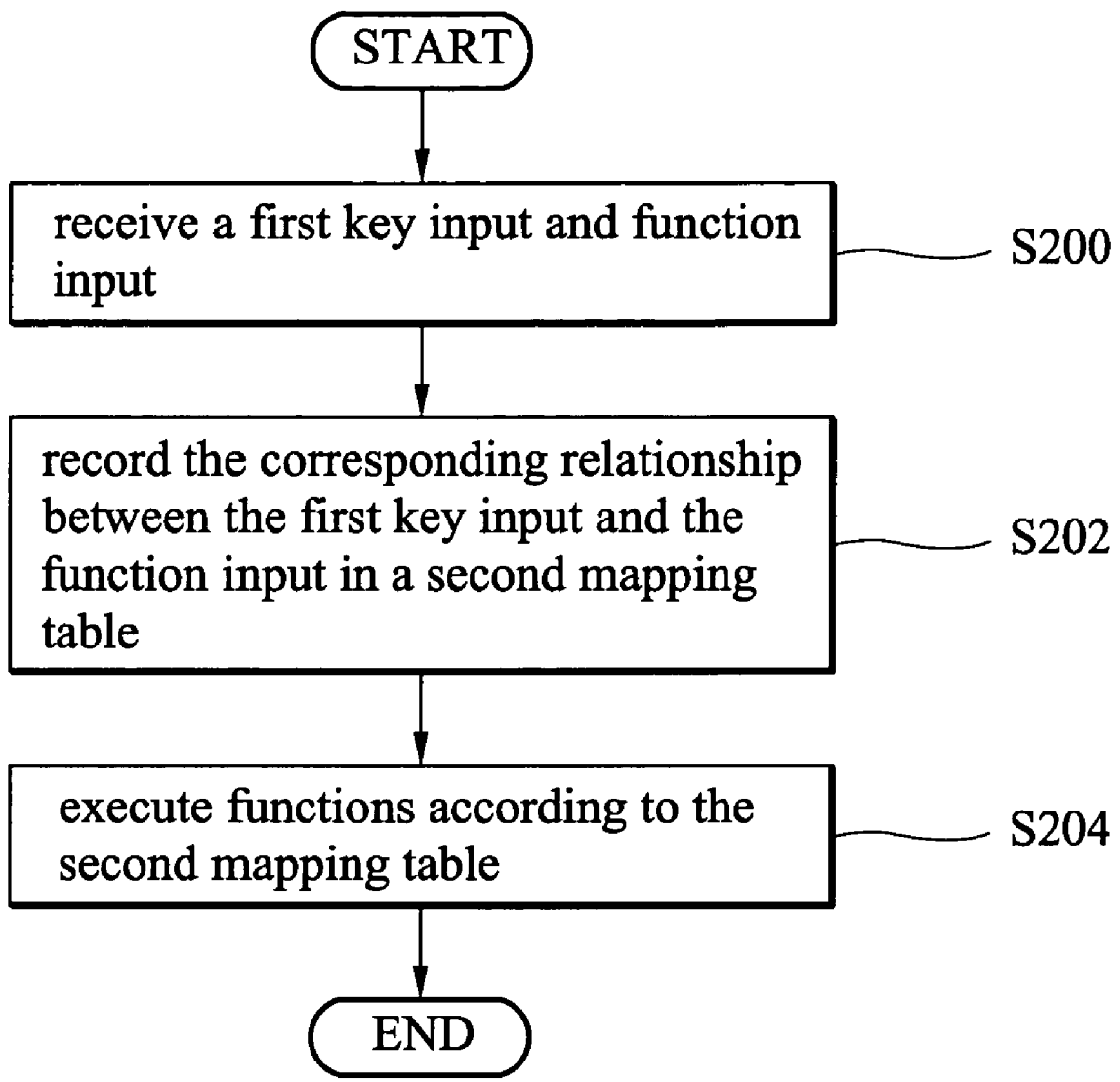
FIG. 2 is a flowchart of an embodiment of a method of user-defined key setting in a portable electronic communication device.

FIG. 2 is a flowchart of an embodiment of a method of user-defined key setting in a portable electronic communication device. Each key corresponds to a function as defined by a first mapping table. The portable electronic communication device executes the functions according to the first mapping table.

If a user-defined key is to be set, a first key input and function input is received (step S200). The corresponding relationship between the first key input and the function input is recorded in a second mapping table (step S202). The portable electronic communication device executes the functions according to the second mapping table (step S204).

Figure 3:
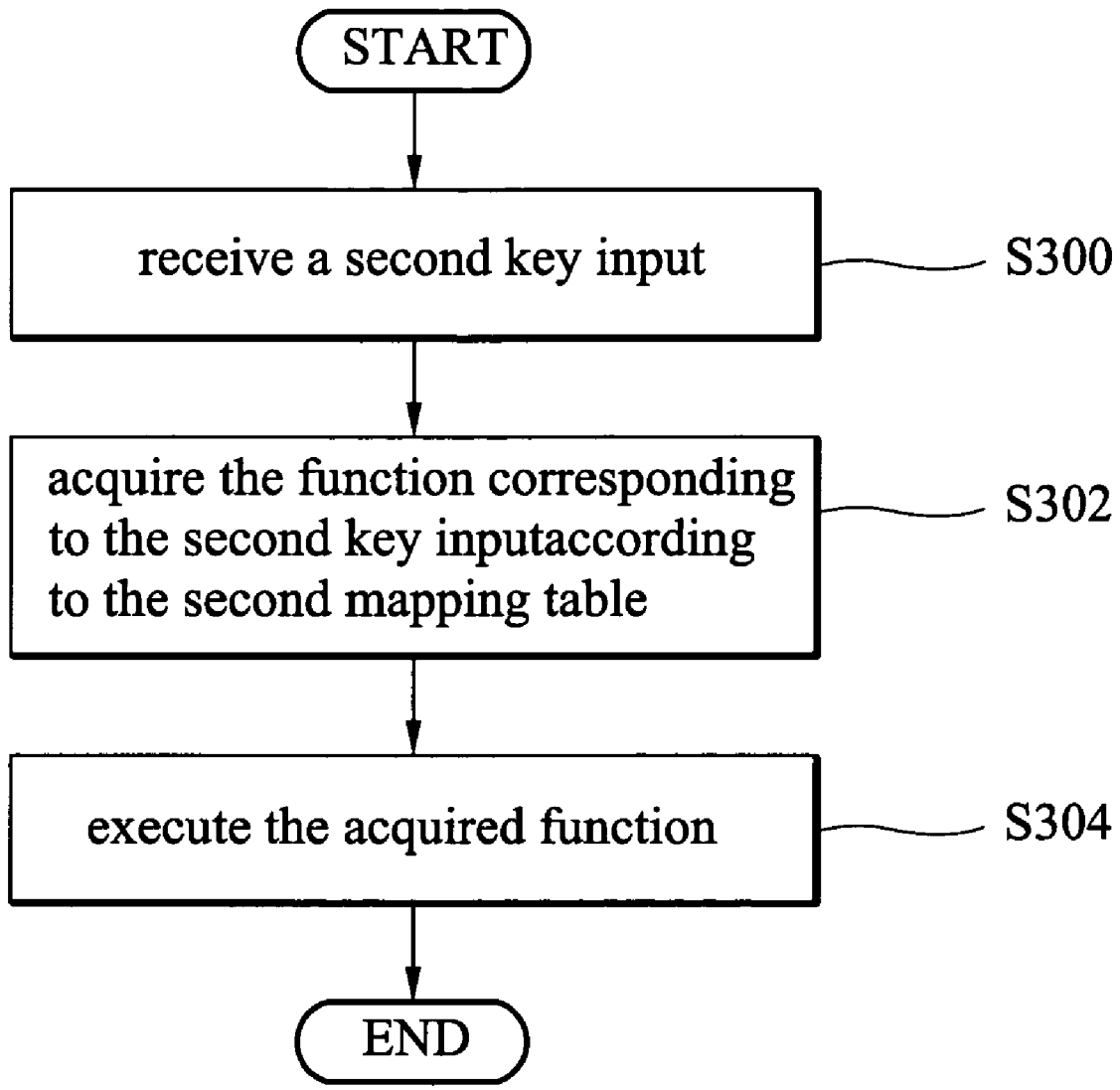
FIG. 3 is a flowchart of an embodiment of another method of user-defined key setting in a portable electronic communication device.

After the user-defined function keys are set, the portable electronic communication device executes functions according to the second mapping table instead of the first mapping table. FIG. 3 is a flowchart of an embodiment of another method of user-defined key setting in a portable electronic communication device. First, a second key input is received (step S300). The portable electronic communication device acquires the function corresponding to the second key input according to the second mapping table (step S302). The acquired function is executed (step S304).

Figure 4:
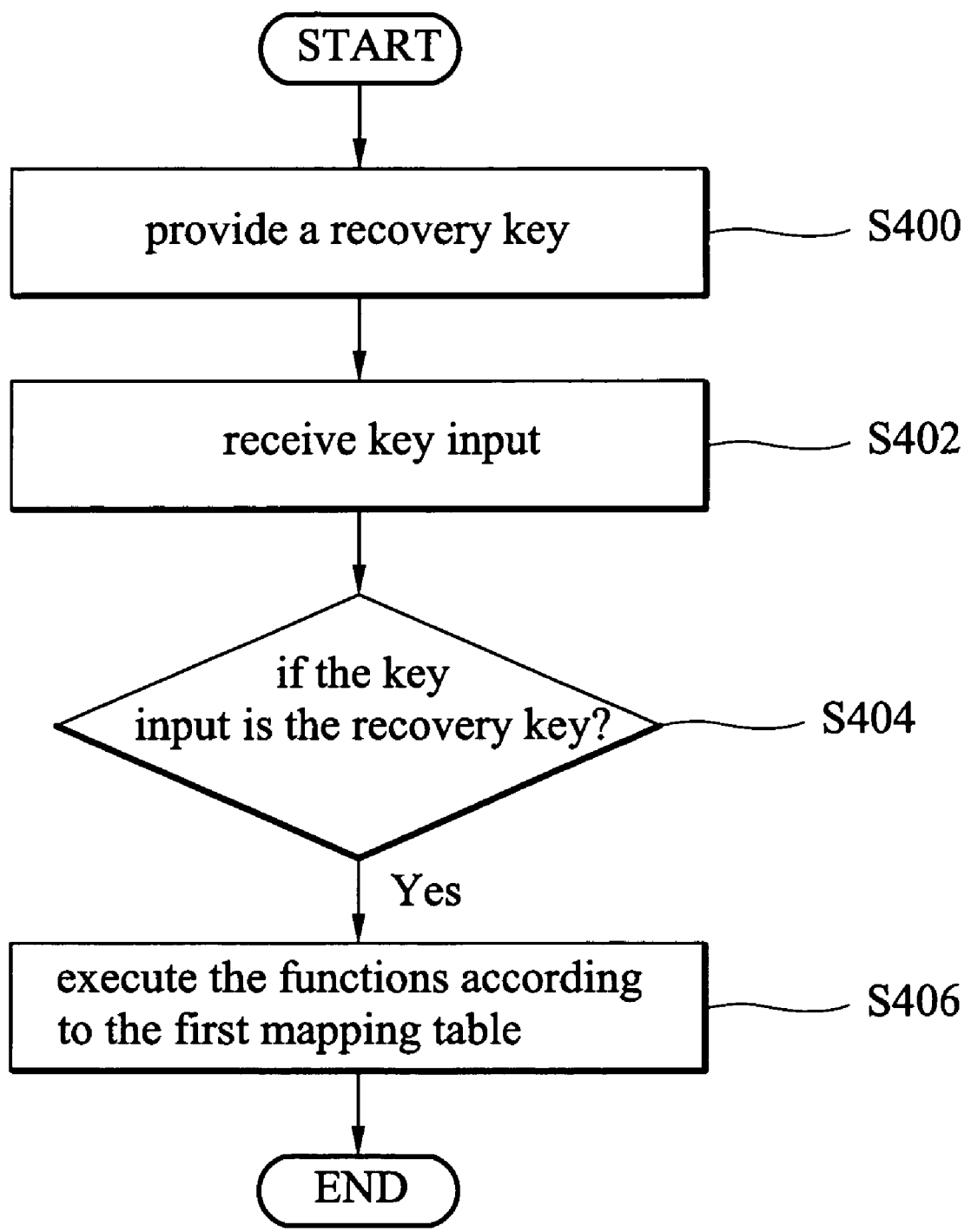
FIG. 4 is a flowchart of an embodiment of another method of user-defined key setting in a portable electronic communication device.

FIG. 4 is a flowchart of an embodiment of another method of user-defined key setting in a portable electronic communication device, comprising a recovery key (step S400). Key input is received (step S402) It is then determined if the key input is the recovery key (step S404). The portable electronic communication device executes the functions according to the first mapping table if the key input represents the recovery key (step S406).

The first mapping table and the second mapping table are stored in the portable electronic communication device simultaneously. The first mapping table is provided by a manufacturer, and the second mapping table is defined by user. After user-defined function keys are set, the portable electronic communication device executes functions according to the second mapping table, with first mapping table reserved for recovery.

Referring to FIG. 1 again, in one exemplary embodiment, a portable electronic communication device provides a menu key, a dial key, and an off key, such as keys b, g, and d, respectively. The portable electronic communication device executes functions according to a first mapping table. Additionally, key c is set as a recover key.

Figure 1:
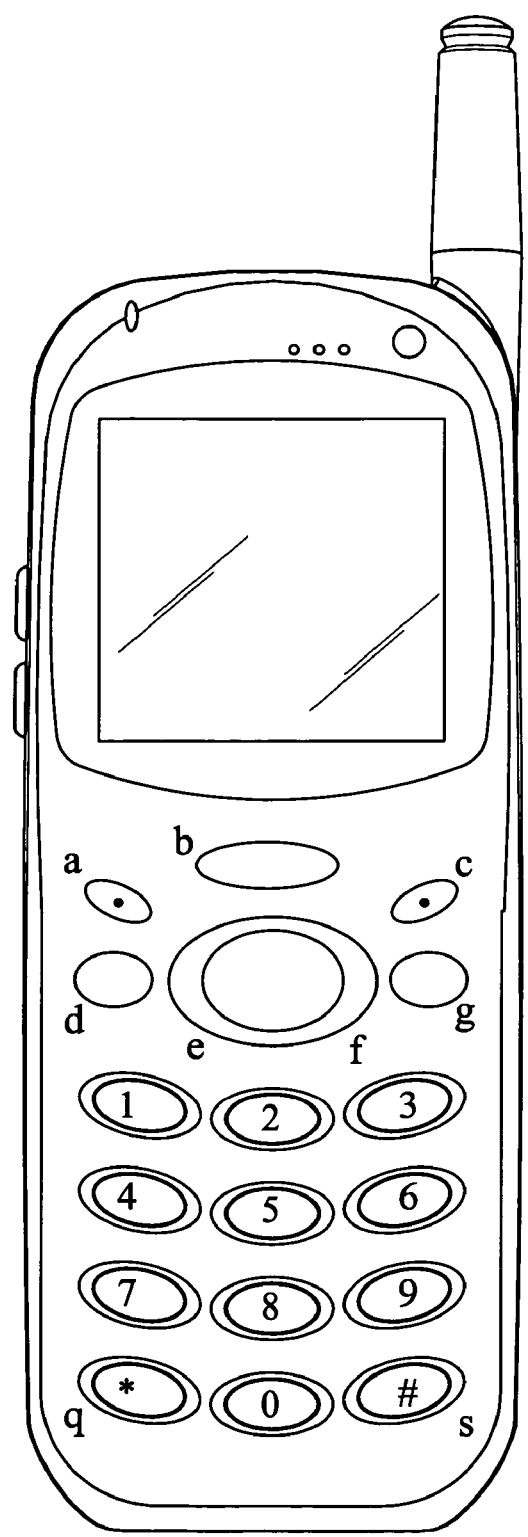
FIG. 1 is a diagram of a keypad of an exemplary portable electronic communication device.

To set a user-defined function key, a key and a function are input. For example, if a pound key, as shown in FIG. 1, key S, and a menu function are input, a corresponding relationship is recorded in a second mapping table. If the pound key is entered again, the portable electronic communication device recognizes and acquires the corresponding menu function, which is then executed.

To return to the original function setting, a recovery key is pushed, for example, key C. The portable electronic communication device receives the recovery key input and executes functions according to the first mapping table.

Figure 5:
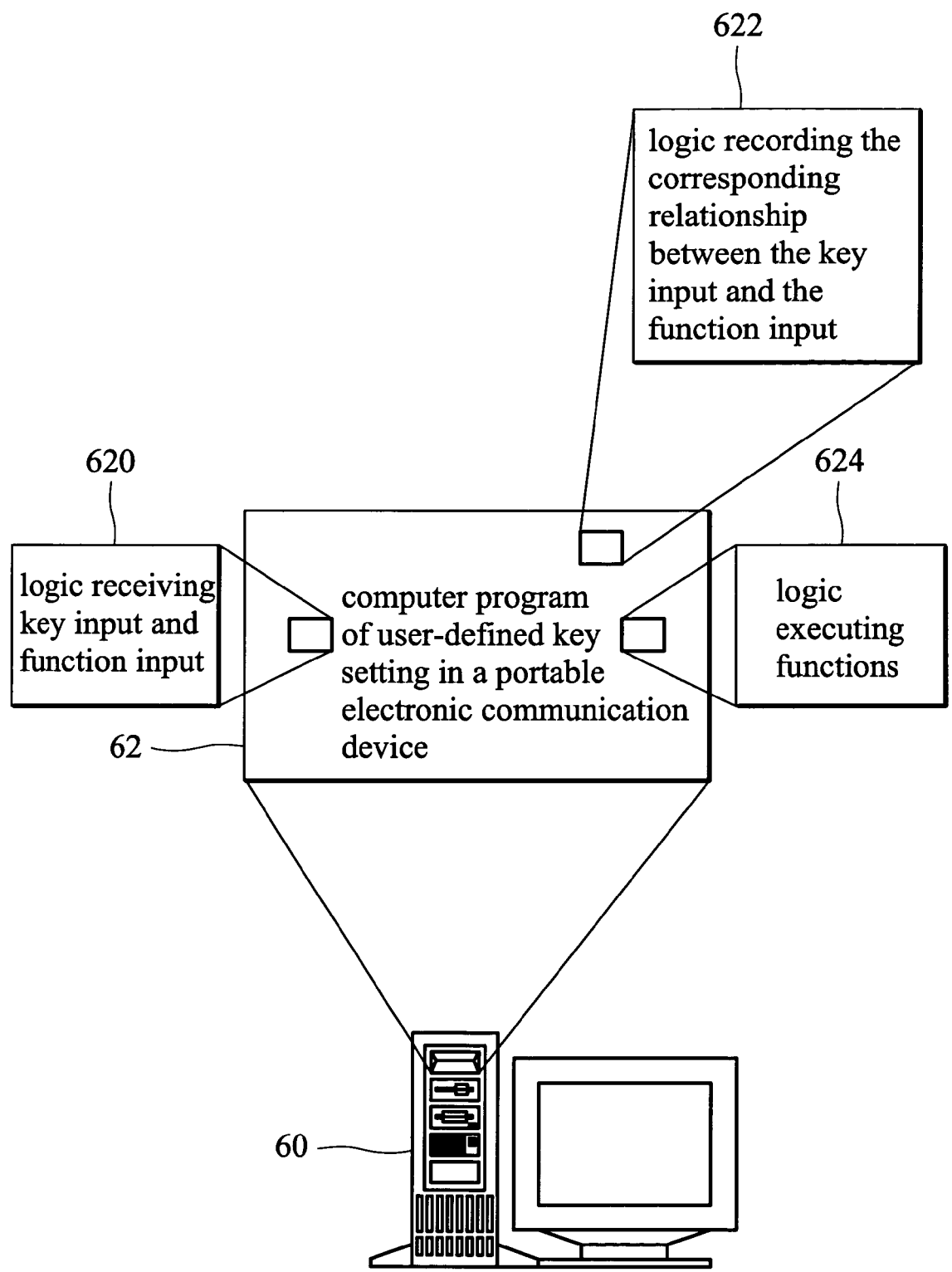
FIG. 5 is a diagram of an embodiment of a machine-readable storage medium storing a computer program providing a method of user-defined key setting in a portable electronic communication device.

Embodiments of machine-readable storage media storing computer programs that provide a method for setting user-defined key in a portable electronic communication device are disclosed. Such computer programs can implement methods such as those previously described. FIG. 5 is a diagram of an embodiment of a machine-readable storage medium storing a computer program providing a method of user-defined key setting in a portable electronic communication device, in which machine-readable storage medium 60 stores a computer program 62, comprising logic receiving key input and function input 620, logic recording the corresponding relationship between the key input and the function input 622, and logic executing functions 624.

Figure 6:
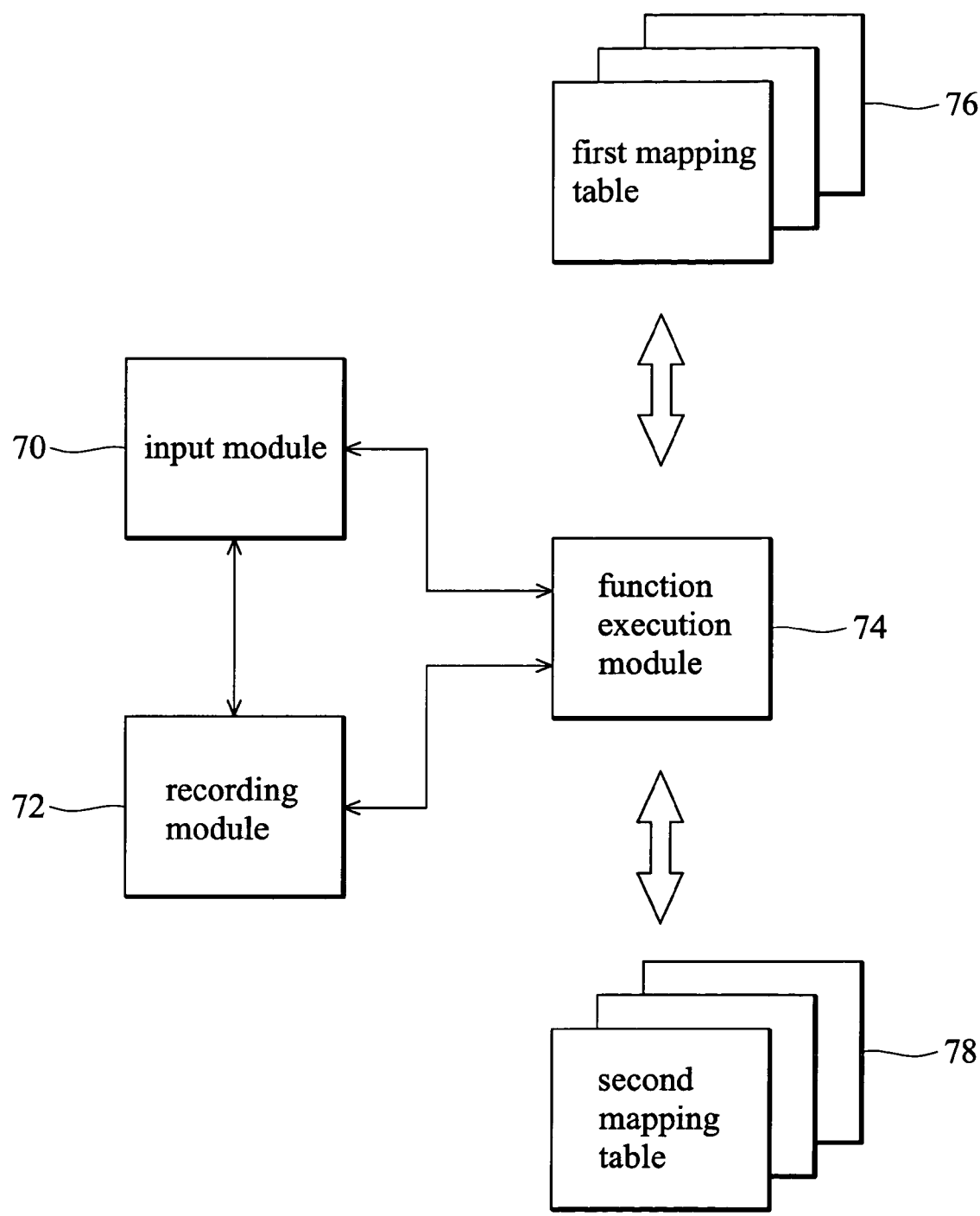
FIG. 6 is a diagram of an embodiment of a portable electronic communication device with user-defined key setting function.

FIG. 6 is a diagram of an embodiment of a portable electronic communication device with user-defined key setting function, in which each key corresponds to one function and the corresponding relationship is recorded in a first mapping table. The portable electronic communication device executes the functions according to the first mapping table 76. The portable electronic communication device comprises an input module 70, a recording module 72, and a function execution module 74.

The input module receives key input and function input. The recording module 72 is coupled to the input module 70 and records the corresponding relationship between the key input and the function input in a second mapping table 78. The function execution module 74 is coupled to the input module 70 and the recording module 72. The function execution module 74 executes the functions according to the first mapping table 76 or the second mapping table 78.

The portable electronic communication device further comprises a recovery key. The input module 70 receives key input. The portable electronic communication device executes the function according to the first mapping table 76 if the key input represents the recovery key. The first mapping table 76 and the second mapping table 78 are recorded in the portable electronic communication device simultaneously.

Methods of the present invention, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing and embodiment of the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the invention. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method of user-defined key setting in a portable device, providing at least one key and function, each key having a corresponding relationship to one function, wherein the corresponding relationship is recorded in a first mapping table and the portable device executes the functions according to the first mapping table, the method comprising:

receiving a first key input by a first key and a function input, wherein the first key is one of the keys on the portable device, and the function input represents one of the functions provided by the portable device;

recording a corresponding relationship between the first key input and the function input in a second mapping table; and the portable device executing the functions according to the second mapping table.

2. The method of user-defined key setting in a portable device as claimed in claim 1, further comprising:

receiving a second key input; and the portable device executing the functions according to the second key input and the second mapping table.

3. The method of user-defined key setting in a portable device as claimed in claim 1, further comprising:

providing a recovery key on the portable device;

receiving an input of the recovery key and the portable device executing the functions according to the first mapping table.

4. The method of user-defined key setting in a portable device as claimed in claim 1, wherein the first and the second mapping tables are recorded in the portable device.

5. A machine-readable storage medium storing a computer program providing a method of user-defined key setting in a portable device, providing at least one key and function, each key having a corresponding relationship to one function, wherein the corresponding relationship is recorded in a first mapping table and the portable device executes the functions according to the first mapping table, the method comprising:

receiving a first key input and a function input, wherein the first key is one of the keys on the portable device, and the function input represents one of the functions provided by the portable device; recording the corresponding relationship between the first key input and the function input in a second mapping table; and the portable device executing the functions according to the second mapping table.

6. The machine-readable storage medium as claimed in claim 5, the method further comprising:

receiving a second key input; and the portable device executing the functions according to the second key input and the second mapping table.

7. The machine-readable storage medium as claimed in claim 5, the method further comprising:

providing a recovery key on the portable device;

receiving an input of the recovery key and the portable device executing the functions according to the first mapping table.

8. The machine-readable storage medium as claimed in claim 5, wherein the first and the second mapping tables are recorded in the portable device.

9. A portable device comprising:

a plurality, each key having a corresponding relationship to one function, wherein the corresponding relationship is recorded in a first mapping table and the portable device executes the function according to the first mapping table;

an input module, receiving a key input by a first key and a function input, wherein the key is selected from the keys on the portable device and the function input represents one function provided by the portable device;

a recording module, for recording a corresponding relationship between the key input and the function input in a second mapping table; and a function execution module, for executing the functions selectively according to the first and the second mapping table.

10. The portable device as claimed in claim 9, further comprising:

a recovery key, wherein the input module receives a key input of the recovery key and the portable device executes the functions according to the first mapping table.

11. The portable device as claimed in claim 9, wherein the first and the second mapping tables are recorded in the portable device.

* * * * *